US011479215B2

(12) United States Patent
Liu et al.

(10) Patent No.: US 11,479,215 B2
(45) Date of Patent: Oct. 25, 2022

(54) WHEEL OUTER RIM GROOVE POLISHING DEVICE

(71) Applicant: CITIC Dicastal CO., LTD., Hebei (CN)

(72) Inventors: Huiying Liu, Qinhuangdao (CN); Hongsen Zhang, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 945 days.

(21) Appl. No.: 16/257,220

(22) Filed: Jan. 25, 2019

(65) Prior Publication Data

US 2019/0359181 A1 Nov. 28, 2019

(30) Foreign Application Priority Data

May 24, 2018 (CN) .......................... 201810504894.6

(51) Int. Cl.
*B60S 3/04* (2006.01)
*B08B 1/04* (2006.01)
*B24B 5/44* (2006.01)
*B24B 29/04* (2006.01)

(52) U.S. Cl.
CPC ................ *B60S 3/042* (2013.01); *B08B 1/04* (2013.01); *B24B 5/44* (2013.01); *B24B 29/04* (2013.01)

(58) Field of Classification Search
CPC ... B60S 3/042; B08B 1/04; B24B 5/44; B24B 5/06; B24B 9/00; B24B 9/02; B24B 9/04; B24B 19/26; B24B 19/28; B24B 27/0023; B24B 27/0076; B24B 41/06; B24B 41/067; B24B 49/02; B23B 5/28; B23B 2215/08; B23B 2220/08
USPC .......................... 451/66, 173, 324, 5, 10, 11
See application file for complete search history.

(56) References Cited

FOREIGN PATENT DOCUMENTS

| CN | 203791148 U | 8/2014 |
| CN | 107350944 A | 11/2017 |
| CN | 107414193 A | 12/2017 |
| CN | 207309492 U | 5/2018 |
| CN | 208409490 U | 1/2019 |

*Primary Examiner* — Joseph J Hail
*Assistant Examiner* — Caleb Andrew Holizna
(74) *Attorney, Agent, or Firm* — Cooper Legal Group, LLC

(57) ABSTRACT

The wheel outer rim groove polishing device includes three major systems, which are a wheel rotation system which is used for positioning, clamping and rotating of a wheel, thereby polishing all grooves in the circumferential direction of the wheel, a left polishing system for reciprocally polishing groove tool grains in the longitudinal direction, and a right polishing system for reciprocally polishing groove tool grains in the transverse direction; and three systems cooperate with each other and are combined orderly to jointly complete the polishing of tool grains on the wheel outer rim grooves. The present disclosure can meet the requirements for polishing the tool grains on the wheel outer rim grooves. Compared with artificial polishing, the device improves the polishing effect, improves the work efficiency, and reduces the risk of rim deformation. The device has the characteristics of high efficiency, practicality, easy manufacture, flexible operation and the like.

2 Claims, 1 Drawing Sheet

WHEEL OUTER RIM GROOVE POLISHING DEVICE

CROSS-REFERENCE TO RELATED APPLICATIONS

The present application claims benefit of Chinese Application No. 201810504894.6, filed on May 24, 2018, the contents of which are hereby incorporated by reference in its entirety.

BACKGROUND

Wheels are required to have high strength and attractiveness. At present, the design of wheels pursues light weight and high strength. When the requirement for strength is met, the weight of wheels is required to be reduced as much as possible. The common weight reduction way is to design grooves on the outer rim. Generally, eight square grooves are designed for weight reduction. After the grooves are milled, the surface has machining tool grains, and the tool grains need to be polished away according to the design requirements. If artificial polishing is used, the efficiency is low, the polishing is not uniform, and deformation is easily caused. Based on this situation, the present disclosure provides a device for polishing tool grains on wheel outer rim grooves.

SUMMARY

The present disclosure relates to the field of surface treatment, and specifically relates to a hub surface treatment device.

The objective of the present disclosure is to provide a device for polishing tool grains on wheel outer rim grooves to improve the polishing effect, improve the work efficiency and reduce the risk of rim deformation. The device has the characteristics of high efficiency, practicality, easy manufacture, flexible operation and the like.

In order to achieve the above objective, the technical solution of the present disclosure is: a wheel outer rim groove polishing device, consists of a frame, a servo motor, a bracket, bearing seats, a shaft, a rotating plate, a tensioning cylinder, an expansion core, an expansion sleeve, a first feed guide rail, a first feed sliding block, a first feed cylinder, platforms, adjustment guide rails, a first adjustment sliding block and a second adjustment sliding block, a first adjustment cylinder and a second adjustment cylinder, connecting rods, a first turning plate, a second turning plate, a longitudinal cylinder, a longitudinal guide rail, a longitudinal sliding block, a first polishing motor, a first polishing head, a second feed cylinder, a second feed guide rail, a second feed sliding block, a transverse cylinder, transverse guide rails, a transverse sliding block, a second polishing motor and a second polishing head.

The wheel outer rim groove polishing device consists of three major systems, which are a wheel rotation system, which is used for positioning, clamping and rotating of a wheel, thereby polishing all grooves in the circumferential direction of the wheel a left polishing system for reciprocally polishing groove tool grains in the longitudinal direction, and a right polishing system for reciprocally polishing groove tool grains in the transverse direction; the wheel rotation system, the left polishing system and the right polishing system cooperate with each other and are combined orderly to jointly complete the polishing of tool grains on the wheel outer rim grooves.

The servo motor is fixed to the frame via the bracket, an output end of the motor is connected to the rotating plate to control the rotation of the rotating plate, and an upper end surface of the rotating plate is used for axial positioning of the wheel. The tensioning cylinder is fixed on the rotating plate and an output end of the tensioning cylinder is connected to the expansion core, the expansion core fits with the expansion sleeve, the tensioning cylinder drives the expansion core to move down, and the expansion sleeve can be opened to radially position and clamp the wheel. This is the wheel rotation system.

The first feed cylinder is mounted above a left side of the frame, and an output end of the first feed cylinder is connected to the first feed sliding block. Under the guidance of the first feed guide rail, the first feed cylinder controls horizontal feed of the first feed sliding block. The platform is mounted on the first feed sliding block, the first adjustment cylinder is mounted on the platform and an output end of the first adjustment cylinder is connected to the first adjustment sliding block. Under the guidance of the adjustment guide rail, the first adjustment cylinder controls the horizontal movement of the first adjustment sliding block. The first turning plate is hinged with the platform, one end of the connecting rod is hinged with the first adjustment sliding block and the other end is hinged with the first turning plate. The first adjustment cylinder drives horizontal movement of the first adjustment sliding block to adjust the inclination angle of the first turning plate to adapt to the polishing of wheel outer rim grooves in different angles. The longitudinal cylinder is fixed on the first turning plate. Under the guidance of the longitudinal guide rail, the longitudinal cylinder controls the reciprocating movement of the longitudinal sliding block. The first polishing motor is fixed on the longitudinal sliding block, and the first polishing head is mounted at an output end of the first polishing motor. This is the left polishing system for reciprocally polishing groove tool grains in the longitudinal direction.

The second feed cylinder is mounted on a right side of the frame, and an output end of the second feed cylinder is connected to the second feed sliding block. Under the guidance of the second feed guide rail, the second feed cylinder controls horizontal feed of the second feed sliding block. A second turning plate angle adjustment mechanism is also arranged on the second feed sliding block. The second adjustment cylinder drives horizontal movement of the second adjustment sliding block to adjust the inclination angle of the second turning plate to adapt to the polishing of the wheel outer rim grooves in different angles. The transverse cylinder is fixed on the second turning plate. Under the guidance of the transverse guide rails, the transverse cylinder controls the reciprocating movement of the transverse sliding block. The second polishing motor is fixed on the transverse sliding block, and the second polishing head is mounted at an output end of the second polishing motor. This is the right polishing system for reciprocally polishing groove tool grains in the transverse direction.

The operating process of the wheel outer rim groove polishing device is: before operation, the angles of the first polishing head and second polishing head are adjusted to be perpendicular to the surfaces of grooves according to the shape of a wheel outer rim. First, the wheel is placed on the rotating plate, and the tensioning cylinder is started to position and clamp the wheel; then the first polishing head and the second polishing head simultaneously rotate, the first feed cylinder and the second feed cylinder are simultaneously started to drive the first polishing head and second polishing head to contact a wheel outer rim groove, the left polishing system reciprocally polishes groove tool grains in the longitudinal direction, and the right polishing system reciprocally polishes groove tool grains in the transverse direction. After the tool grains on one groove are polished, the first feed cylinder and the second feed cylinder are simultaneously started to drive the first polishing head and second polishing head to leave the wheel outer rim groove, the servo motor drives the wheel to rotate a certain angle, the first feed cylinder and the second feed cylinder are started again to drive the first polishing head and second polishing head to contact next wheel outer rim groove so as to polish the tool grains on the groove, and so on. After the hub rotates one circle, each groove is polished transversely and longitudinally, and the tool grains can be polished thoroughly.

The present disclosure can meet the requirements for polishing the tool grains on the wheel outer rim grooves. Compared with artificial polishing, the wheel outer rim groove polishing device in present disclosure improves the polishing effect, improves the work efficiency, and reduces the risk of rim deformation. The wheel outer rim groove polishing device has the characteristics of high efficiency, practicality, easy manufacture, flexible operation and the like.

Figure 1:
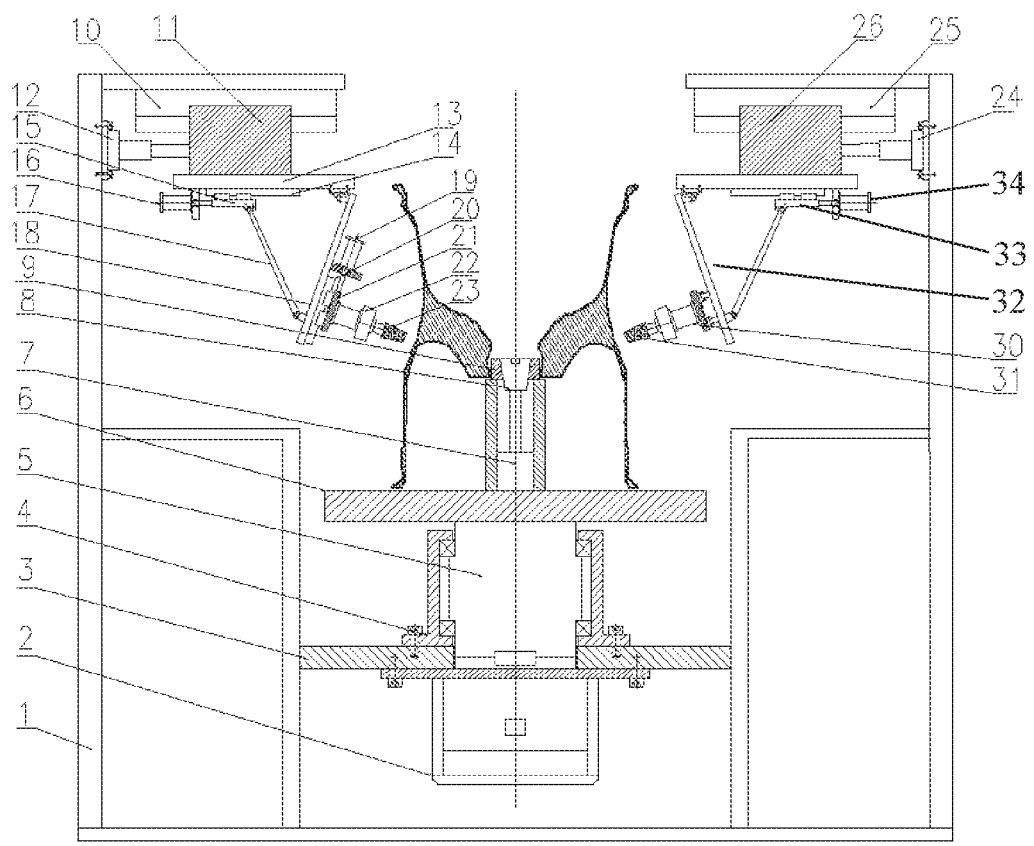
FIG. 1 is a front view of a wheel outer rim groove polishing device according to the present disclosure.
Figure 2:
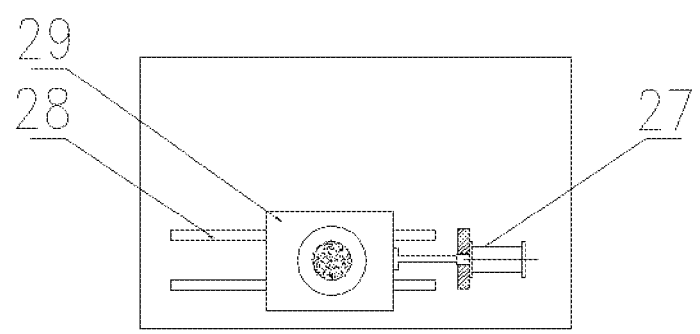
FIG. 2 is a top view of a right turning plate of the wheel outer rim groove polishing device according to the present disclosure.

LIST OF REFERENCE SYMBOLS 1-frame, 2-servo motor, 3-bracket, 4-bearing seat, 5-shaft, 6-rotating plate, 7-tensioning cylinder, 8-expansion core, 9-expansion sleeve, 10-first feed guide rail, 11-first feed sliding block, 12-first feed cylinder, 13-platform, 14-adjustment guide rail, 15-first adjustment sliding block, 16-first adjustment cylinder, 17-connecting rod, 18-first turning plate, 19-longitudinal cylinder, 20-longitudinal guide rail, 21-longitudinal sliding block, 22-first polishing motor, 23-first polishing head, 24-second feed cylinder, 25-second feed guide rail, 26-second feed sliding block, 27-transverse cylinder, 28-transverse guide rail, 29-transverse sliding block, 30-second polishing motor, 31-second polishing head, 32-second turning plate, 33-second adjustment sliding block, 34-second adjustment cylinder.

DETAILED DESCRIPTION

The details and working conditions of the specific device proposed by the present disclosure will be described below in combination with the accompanying drawings.

A wheel outer rim groove polishing device consists of a frame 1, a servo motor 2, a bracket 3, bearing seats 4, a shaft 5, a rotating plate 6, a tensioning cylinder 7, an expansion core 8, an expansion sleeve 9, a first feed guide rail 10, a first feed sliding block 11, a first feed cylinder 12, platforms 13, adjustment guide rails 14, a first adjustment sliding block 15, a second adjustment sliding block 33, a first adjustment cylinder 16, a second adjustment cylinder 34, connecting rods 17, a first turning plate 18, a second turning plate 32, a longitudinal cylinder 19, a longitudinal guide rail 20, a longitudinal sliding block 21, a first polishing motor 22, a first polishing head 23, a second feed cylinder 24, a second feed guide rail 25, a second feed sliding block 26, a transverse cylinder 27, transverse guide rails 28, a transverse sliding block 29, a second polishing motor 30 and a second polishing head 31.

The wheel outer rim groove polishing device consists of three major systems, which are a wheel rotation system which is used for positioning, clamping and rotating of a wheel, thereby polishing all grooves in the circumferential direction of the wheel, a left polishing system for reciprocally polishing groove tool grains in the longitudinal direction, and a right polishing system for reciprocally polishing groove tool grains in the transverse direction; and the wheel rotation system, the left polishing system and the right polishing system cooperate with each other and are combined orderly to jointly complete the polishing of tool grains on the wheel outer rim grooves.

The servo motor 2 is fixed to the frame 1 via the bracket 3, the output end of the motor is connected to the rotating plate 6 to control the rotation of the rotating plate 6, and the upper end surface of the rotating plate 6 is used for axial positioning of the wheel. The tensioning cylinder 7 is fixed on the rotating plate 6 and the output end of the tensioning cylinder 7 is connected to the expansion core 8, the expansion core 8 fits with the expansion sleeve 9, the tensioning cylinder 7 drives the expansion core 8 to move down, and the expansion sleeve 9 can be opened to radially position and clamp the wheel. This is the wheel rotation system.

The first feed cylinder 12 is mounted above the left side of the frame 1, and the output end of the first feed cylinder 12 is connected to the first feed sliding block 11. Under the guidance of the first feed guide rail 10, the first feed cylinder 12 controls the horizontal feed of the first feed sliding block 11. The platform 13 is mounted on the first feed sliding block 11, the first adjustment cylinder 16 is mounted on the platform 13 and the output end of the first adjustment cylinder 16 is connected to the first adjustment sliding block 15. Under the guidance of the adjustment guide rail 14, the first adjustment cylinder 16 controls the horizontal movement of the first adjustment sliding block 15. The first turning plate 18 is hinged with the platform 13, one end of the connecting rod 17 is hinged with the first adjustment sliding block 15 and the other end is hinged with the first turning plate 18. The first adjustment cylinder 16 drives the horizontal movement of the first adjustment sliding block 15 to adjust the inclination angle of the first turning plate 18 so as to adapt to the polishing of outer rim grooves in different angles. The longitudinal cylinder 19 is fixed on the first turning plate 18. Under the guidance of the longitudinal guide rail 20, the longitudinal cylinder 19 controls the reciprocating movement of the longitudinal sliding block 21. The first polishing motor 22 is fixed on the longitudinal sliding block 21, and the first polishing head 23 is mounted at output end of the first polishing motor 22. This is the left polishing system for reciprocally polishing groove tool grains in the longitudinal direction.

The second feed cylinder 24 is mounted on the right side of the frame 1, and output end of the second feed cylinder 24 is connected to the first feed sliding block 26. Under the guidance of the second feed guide rail 25, the second feed cylinder 24 controls the horizontal feed of the second feed sliding block 26. A second turning plate angle adjustment mechanism is also arranged on the second feed sliding block 26. The second adjustment cylinder drives the horizontal movement of the second adjustment sliding block to adjust the inclination angle of the second turning plate so as to adapt to the polishing of outer rim grooves in different angles. The transverse cylinder 27 is fixed on the right turning plate, that is, the second turning plate. Under the guidance of the transverse guide rails 28, the transverse cylinder 27 controls the reciprocating movement of the transverse sliding block 29. The second polishing motor 30 is fixed on the transverse sliding block 29, and the second polishing head 31 is mounted at an output end of the second polishing motor 30. This is the right polishing system for reciprocally polishing groove tool grains in the transverse direction.

The operating process of the wheel outer rim groove polishing device is: before operation, the angles of the first polishing head and second polishing head are adjusted to be perpendicular to the surfaces of grooves according to the shape of a wheel outer rim. Firstly, the wheel is placed on the rotating plate 6, and the tensioning cylinder 7 is started to position and clamp the wheel; then the first polishing head 23 and the second polishing head 31 simultaneously rotate, the first feed cylinder 12 and the second feed cylinder 24 are simultaneously started to drive the first polishing head and the second polishing head to contact a wheel outer rim groove, the left polishing system reciprocally polishes groove tool grains in the longitudinal direction, and the right polishing system reciprocally polishes groove tool grains in the transverse direction. After the tool grains on one groove are polished, the first feed cylinder 12 and the second feed cylinder 24 are simultaneously started to drive the first polishing head and the second polishing head to leave the wheel outer rim groove, the servo motor 2 drives the wheel to rotate a certain angle, the first feed cylinder 12 and the second feed cylinder 24 are started again to drive the first polishing head and the second polishing head to contact next wheel outer rim groove so as to polish the tool grains on the groove, and so on. After the hub rotates one circle, each groove is polished transversely and longitudinally, and the tool grains can be polished thoroughly.

The present disclosure can meet the requirements for polishing the tool grains on the wheel outer rim grooves. Compared with artificial polishing, the wheel outer rim groove polishing device improves the polishing effect, improves the work efficiency, and reduces the risk of rim deformation. The wheel outer rim groove polishing device has the characteristics of high efficiency, practicality, easy manufacture, flexible operation and the like.

The invention claimed is:

1. A wheel outer rim groove polishing device, comprising: a frame, a servo motor, a bracket, bearing seats, a shaft, a rotating plate, a tensioning cylinder, an expansion core, an expansion sleeve, a first feed guide rail, a first feed sliding block, a first feed cylinder, platforms, adjustment guide rails, a first adjustment sliding block and a second adjustment sliding block, a first adjustment cylinder and a second adjustment cylinder, connecting rods, a first turning plate and a second turning plate, a longitudinal cylinder, a longitudinal guide rail, a longitudinal sliding block, a first polishing motor, a first polishing head, a second feed cylinder, a second feed guide rail, a second feed sliding block, a transverse cylinder, transverse guide rails, a transverse sliding block, a second polishing motor and a second polishing head, wherein the first feed cylinder is mounted on an upper left side of the frame, and an output end of the first feed cylinder is connected to the first feed sliding block; under guidance of the first feed guide rail, the first feed cylinder controls horizontal feed of the first feed sliding block; the first adjustment cylinder drives horizontal movement of the first adjustment sliding block to adjust an inclination angle of the first turning plate to adapt to polishing of wheel outer rim grooves in different angles; the longitudinal cylinder is fixed on the first turning plate; under guidance of the longitudinal guide rail, the longitudinal cylinder controls reciprocating movement of the longitudinal sliding block; and the first polishing motor is fixed on the longitudinal sliding block, and the first polishing head is mounted at an output end of the first polishing motor.

2. The wheel outer rim groove polishing device according to claim 1, wherein the second feed cylinder is mounted on an upper right side of the frame, and an output end of the second feed cylinder is connected to the second feed sliding block; under guidance of the second feed guide rail, the second feed cylinder controls horizontal feed of the second feed sliding block; the second adjustment cylinder drives horizontal movement of the second adjustment sliding block to adjust an inclination angle of the second turning plate to adapt to the polishing of the wheel outer rim grooves in different angles; the transverse cylinder is fixed on the second turning plate; under guidance of the transverse guide rails, the transverse cylinder controls reciprocating movement of the transverse sliding block; and the second polishing motor is fixed on the transverse sliding block, and the second polishing head is mounted at an output end of the second polishing motor.

\* \* \* \* \*